United States Patent
Pinel et al.

(10) Patent No.: US 8,735,334 B2
(45) Date of Patent: May 27, 2014

(54) LUBRICATION COMPOSITION WITH AN ADAPTABLE COEFFICIENT OF FRICTION, FOR A THREADED ELEMENT OF A THREADED TUBULAR CONNECTION COMPONENT

(75) Inventors: Eliette Pinel, Sainte-Euphémie (FR); Eric Gard, Sathonay Village (FR); Kunio Goto, Osaka (JP)

(73) Assignees: Vallourec Oil and Gas France, Aulnoye-Aymeries (FR); Sumitomo Metal Industries, Ltd., Osaka-shi (JP)

( * ) Notice: Subject to any disclaimer, the term of this patent is extended or adjusted under 35 U.S.C. 154(b) by 262 days.

(21) Appl. No.: 13/123,909

(22) PCT Filed: Oct. 5, 2009

(86) PCT No.: PCT/EP2009/007100
§ 371 (c)(1), (2), (4) Date: Apr. 13, 2011

(87) PCT Pub. No.: WO2010/043316
PCT Pub. Date: Apr. 22, 2010

(65) Prior Publication Data
US 2011/0285124 A1    Nov. 24, 2011

(30) Foreign Application Priority Data
Oct. 15, 2008  (FR) ..................................... 08 05714

(51) Int. Cl.
*C10M 105/34*   (2006.01)
*F16L 15/00*    (2006.01)

(52) U.S. Cl.
CPC ....... *C10M 105/34* (2013.01); *C10M 2213/062* (2013.01); *C10M 2207/126* (2013.01); *F16L 15/00* (2013.01)
USPC ............................................ 508/100; 285/94

(58) Field of Classification Search
USPC ........................................... 508/100; 285/94
See application file for complete search history.

(56) References Cited

U.S. PATENT DOCUMENTS

| 5,865,884 A | 2/1999 | Segawa et al. |
| 6,871,419 B1 * | 3/2005 | Becker et al. .................. 34/416 |

(Continued)

FOREIGN PATENT DOCUMENTS

| DE | 100 02 236 | 7/2001 |
| FR | 2 892 174 | 4/2007 |

(Continued)

OTHER PUBLICATIONS

Anonymous: Halox SZP-391 "Universal Corrosion Inhibitor", Technical Data, Internet Article, Total p. 1, (Feb. 27, 2006), XP-002526146.

(Continued)

*Primary Examiner* — James Goloboy
(74) *Attorney, Agent, or Firm* — Oblon, Spivak, McClelland, Maier & Neustadt, L.L.P.

(57) ABSTRACT

A film-forming lubrication composition for make-up of threaded connections, intended to cover at least one threading (FE, FI) and a make-up abutment (BVM, BVF) of a threaded element (EM, EF) of a component (T2, T1) of a threaded tubular connection (JF) with a solid state film which adheres to the threading (FE, FI) and to said make-up abutment (BVM, BVF), said make-up abutment (BVM, BVF) being intended to bear against another abutment (BVF, BVM) of another component (T1, T2) of said threaded tubular connection (JF) during the terminal make-up phase, and said lubrication composition comprising a matrix. The matrix further comprises at least one rheoresistant material selected so as to endow said composition, as a complement to lubrication, with a shouldering torque which is at least equal to a threshold value.

17 Claims, 2 Drawing Sheets

(56) References Cited

U.S. PATENT DOCUMENTS

| | | |
|---|---|---|
| 2008/0269388 A1 | 10/2008 | Markovich et al. |
| 2009/0220780 A1 | 9/2009 | Bordet et al. |
| 2010/0167968 A1 | 7/2010 | Pinel et al. |
| 2010/0201119 A1 | 8/2010 | Bordet et al. |

FOREIGN PATENT DOCUMENTS

| | | |
|---|---|---|
| FR | 2 914 926 | 10/2008 |
| JP | 2005-290112 A | 10/2005 |
| SU | 939528 | 6/1982 |
| UA | 69 206 | 8/2004 |
| WO | 2006 104251 | 10/2006 |
| WO | 2006 113000 | 10/2006 |
| WO | WO 2007042231 A2 * | 4/2007 |

OTHER PUBLICATIONS

International Search Report Issued Dec. 21, 2009 in PCT/EP09/007100 filed Oct. 5, 2009.

U.S. Appl. No. 13/894,907, filed May 15, 2013, Pinel, et al.

* cited by examiner

LUBRICATION COMPOSITION WITH AN ADAPTABLE COEFFICIENT OF FRICTION, FOR A THREADED ELEMENT OF A THREADED TUBULAR CONNECTION COMPONENT

This application is a National Stage of PCT/EP09/007100 filed Oct. 5, 2009 and claims the benefit of FR 0805714 filed Oct. 15, 2008.

The invention relates to components of threaded tubular connections used, for example, in oil applications, and more precisely to the lubrication of portion(s) of the threaded element(s) of threaded tubular connection components comprising a make-up abutment.

The term "component" as used here means any element or accessory intended to be connected via a threading to another component to constitute a threaded tubular connection with that other component. The component may, for example, be a relatively great-length tube (in particular of about ten meters in length), a tubular coupling a few tens of centimeters long, an accessory for such tubes (a hanger, a cross-over, a safety valve, a tool joint, and the like).

Such a component may, for example, be used in drilling or operating a well. In this case, the components are assembled together in order to be dropped into the hydrocarbon or the like wells and constitute a drill string, a casing string or a liner string or even a tubing string (operating strings).

Threaded elements produced at the end of a component (tube or coupling) must first of all be protected against corrosion during transport and storage on the drill site and to this end, they are traditionally coated with protective grease or oil when they leave the production shop.

At the well, they may have to undergo a number of make-up and breakout operations. A make-up operation is defined by a profile (or curve) expressing the make-up (or tightening) torque as a function of the number of turns made. An example of a make-up torque profile corresponding to a premium thread connection with tapered threads is shown diagrammatically in FIG. 1. As can be seen, a make-up torque profile may generally be broken into four parts: a first part P1 during which the external threads of the male threaded element (or pin) of a first component of a threaded tubular connection do not yet radially interfere with the internal threads of the corresponding female threaded element (or box) of a second component of that same threaded tubular connection; a second part P2 during which the geometric interference of the threads of the male and female threaded elements generates radial tightening (interference) which increases as make-up continues (generating a small but increasing make-up torque); a third part P3 during which a sealing surface at the external periphery of the end portion of the male threaded element interferes radially with a corresponding sealing surface of the female threaded element to produce a metal/metal seal; a fourth part P4 during which the frontal end surface of the male threaded element is in axial abutment with the annular surface of a make-up abutment of the female threaded element. This fourth part P4 corresponds to the terminal phase of make-up.

The make-up torque CAB which corresponds to the end of the third part P3 and the start of the fourth part P4 is termed the shouldering torque. The make-up torque CP which corresponds to the end of the fourth part P4 is termed the plastification torque. Beyond this plastification torque CP, it is assumed that the male make-up abutment (end portion of the male threaded element) and/or the female make-up abutment (zone located behind the annular abutment surface of the female threaded element) undergoes plastic deformation, which may degrade the contact sealing performance of the sealing surfaces. The difference between these plastification torque CP and shouldering torque CAB values is termed the torque on shoulder resistance CSB with (CSB=CP−CAB).

A threaded tubular connection is subjected to an optimized tightening at the end of make-up, which is the measure of optimized mechanical strength of the threaded assembly, for example as regards tensile stresses, but also as regards accidental breakout in service, and optimized sealing performance. The designer of the threaded connection must thus define, for a given type of threaded connection, the value of the optimized make-up torque which must, for all assemblies of that type of connection, be less than the plastification torque CP (to avoid plastification of the abutments and the subsequent disadvantages) and more than the shouldering torque CAB. Make-up termination at a torque below CAB does not guarantee a correct relative position for the male and female elements and thus an appropriate tightening for their sealing surfaces. The effective value of a shouldering torque CAB fluctuates greatly from one assembly to another for the same type of connection as it depends on the effective diameters of the threads and the male and female sealing surface(s), and the optimized make-up torque should be substantially higher than the shouldering torque CAB. As a consequence, the higher the value of the torque on shoulder resistance CSB, the larger the margin for defining the optimized make-up torque and the stronger will be the threaded connection as regards operational stresses.

To protect sensitive portions such as the threadings against galling during make-up and breakout operations, the threadings are traditionally freed of protective grease and coated with special make-up grease such as API RP 5A3 (previously API Bull. 5A2) grease. The use of such grease charged with heavy and/or toxic metals such as lead, in addition to the disadvantage of having to carry out a second coating at the well head, suffers from the disadvantage of causing pollution of the well and the environment as the excess grease is ejected from the threadings during make-up.

Other types of protection have been proposed.

Thus, replacing the two successive coatings of grease by a single coating, which coating is carried out at the threaded element production shop, of a thin layer of a lubricant with a pasty or waxy consistency termed semi-dry comprising at least one extreme pressure additive with a chemical action has been proposed. That thin layer constitutes a semi dry covering which suffers from the disadvantage of requiring mechanical protection against pollution by particles of dust or sand during transport and storage.

Other proposals are to replace the grease with various protective solid state coatings applied at the threaded element production shop and comprising a solid matrix which adheres to the substrate in which particles of solid lubricant(s) are dispersed; more particularly, molybdenum disulphide $MoS_2$ can be cited.

WO-2006/104251 discloses a made up connection comprising a lubricating viscous layer covered with a solid dry film. The film is not lubricating. The lubricating layer is not in the solid state.

French patent application 0702634, not published at the date of filing, concerns a lubrication composition comprising a braking additive dispersed in a matrix and selected to provide the composition, as a complement to lubrication, with a coefficient of friction which is selected to obtain a torque on shoulder resistance of at least equal to a threshold value.

Thus, the invention aims to improve the situation, and more precisely to offer a lubrication composition (or coating) with a coefficient of friction which is selected in order to obtain a selected value for the torque on shoulder resistance defined from that which has been obtained for the same threaded connection with threaded elements coated with a standard API RP 5A3 grease, to allow an optimized standard make-up torque value (standard value determined with API RP 5A3 grease) to be used. This can avoid reducing the value of the optimized make-up torque for this type of connection and for the reference API grease, and in extreme cases can avoid no longer being able to guarantee the function of the abutment.

To this end, the invention proposes a film-forming lubrication composition for make-up of threaded connections, intended to cover at least one threading and a make-up abutment of a threaded element of a component of a threaded tubular connection with a film which adheres to the threading and the subjacent make-up abutment, said make-up abutment being intended to bear against another abutment of another component of said threaded tubular connection during the terminal make-up phase, and said lubrication composition comprising a matrix. The matrix comprises at least one rheoresistant material selected so as to endow said composition, as a complement to lubrication, with a torque on shoulder resistance value which is at least equal to a threshold value.

In other words, the invention proposes a lubrication composition for make-up of threaded connections wherein the elastic effect may be selected as a function of the Hertz stresses to which the threaded element—which it must partially cover—must be subjected at the end of the tightening operations. The elastic effect may be selected as a function of the friction velocity.

Depending on the constraints of the application under consideration, the composition may be either in the whole form, and more particularly in a solid form to be sprayed in the molten state, or diluted in the form of a dispersion or an emulsion in an organic compound or in water.

The composition of the threaded connection make-up lubricant may be divided into a number of variations, at least some of which are characteristics which may be combined, in particular:

said rheoresistant material(s) is (are) arranged to allow a torque on shoulder resistance value to be obtained which is at least equal to a threshold value equal to 90% of a reference torque on shoulder resistance value for an API RP 5A3 type grease;

said rheoresistant material(s) is (are) arranged to allow a torque on shoulder resistance value to be obtained which is at least equal to a threshold value equal to 95%, preferably 100%, more preferably 120% of a reference torque on shoulder resistance value for an API RP 5A3 type grease obtained for said threaded tubular connection (JF);

the rheoresistant material includes 1% to 99% of terpene resin based on alpha pinene, rosinic acid and resinic acid esterified with pentaerythritol, on rosinic acid and resinic acid hydrogenated and esterified with glycerine and/or on polymerized rosin, as a composition by weight;

the rheoresistant material comprises 1% to 99% of rosinic acid and resinic acid esterified with pentaerythritol, as a composition by weight;

the composition comprises 10% to 25% of rheoresistant material, as a composition by weight;

the rheoresistant material comprises 1% to 10% of polyalkyl methacrylate, as a composition by weight;

the composition comprises 5% to 20% of polyethylene wax;

the composition comprises 0 to 5% of polyethylene/polytetrafluoroethylene composite;

the composition comprises 10% to 25% of esterified rosin, preferably 10% to 20%;

the composition comprises 0 to 20% of carnauba wax, preferably 4% to 12%;

the composition comprises 10% to 35% of zinc stearate, preferably 20% to 26%;

the composition comprises 10% to 40% of zinc calcium strontium orthophosphate silicate, preferably 18% to 22%;

the composition comprises 1% to 12% of graphite fluoride, preferably 4.5% to 7%;

the composition comprises 0 to 4% of polytetrafluoroethylene;

the composition comprises 1% to 3% of boron nitride;

the composition comprises 2% to 8% of tungsten disulphide, preferably 3% to 6%;

the composition comprises 2% to 8% of coupling agent, as a composition by weight;

the composition comprises at least one braking additive constituted by dispersions of mineral or organic particles which have a relatively high value for the cleavage load and/or strong particle interactions or attractive bonds between particles and/or a middle to high Mohs hardness and/or rheological behaviour which is resistant or opposes movement, each braking additive being selected from the group comprising at least bismuth oxide, titanium oxide, colloidal silica and carbon black;

the composition comprises particles of solid lubricant(s) dispersed in the matrix;

said solid lubricant particle(s) comprise particles of lubricants from at least one of classes 1, 2, 3 and 4;

the particles of solid lubricant(s) comprise particles of at least one solid lubricant from class 2 and at least one solid lubricant from class 1;

the particles of solid lubricant(s) comprise particles of at least one solid lubricant from class 2 and at least one solid lubricant from class 4;

the particles of solid lubricant(s) comprise particles of at least one solid lubricant from class 1, at least one solid lubricant from class 2 and at least one solid lubricant from class 4;

the particles of solid lubricant(s) comprise particles of at least one solid lubricant from class 2 selected from graphite fluoride, tin sulphides, bismuth sulphides, calcium fluorides and tungsten disulphide;

the particles of solid lubricant(s) comprise at least polytetrafluoroethylene particles as a solid lubricant from class 4;

the particles of solid lubricant(s) comprise at least molecules of at least one fullerene with a spherical or tubular geometry;

said matrix has a solid consistency, which is not tacky to the touch and comprises at least one binder exhibiting viscoelastic behaviour;

said matrix comprises at least one metallic soap;

the soap is selected from the group comprising at least sodium stearate, zinc stearate, calcium stearate, lithium stearate, aluminium stearate and bismuth stearate;

said matrix comprises at least one wax of vegetable, animal, mineral or synthetic origin;

said matrix comprises at least one liquid polymer with a kinematic viscosity at 100° C. of at least 850 mm$^2$/s;

said liquid polymer is selected from the group comprising at least one polyalkyl methacrylate, a polybutene, a polyisobutene, a polysiloxane and a polydialkylsiloxane;

the solid lubricant particles may comprise molecules of at least one fullerene with a spherical geometry or tubular geometry;

the matrix may comprise at least one mineral binder, such as an alkali silicate;

the matrix may have a solid consistency, not tacky to the touch and comprise at least one viscoelastic binder, such as an elastomer or a latex;

the composition by weight of solid lubricants may, for example, be as follows: 20% to 99% graphite fluoride, 5% to 30% boron nitride, 1% to 80% polytetrafluoroethylene;

the composition by weight of solid lubricants may, for example, be as follows: 20% to 99% tin sulphides, 5% to 30% boron nitride, 1% to 80% polytetrafluoroethylene;

the composition by weight of solid lubricants may, for example, be as follows: 20% to 99% bismuth sulphides, 5% to 30% boron nitride, 1% to 80% polytetrafluoroethylene;

the matrix may have a pasty consistency (i.e. having a drop point). In this case, the lubrication composition may comprise at least one extreme pressure additive with a chemical action.

During the course of its research, the Applicant noted the importance of a high torque on shoulder resistance value, for example 100% or more of the reference value, or even of a very high torque on shoulder resistance value, for example 120% or more of the reference value, enabling the geometry of the abutments to be preserved and the number of make-up/breakout operations to be increased.

The invention also proposes a threaded element of a component of a threaded tubular connection, comprising at least one threading and a make-up abutment against which another abutment of another component of said threaded tubular connection must bear at the end of the make-up operation, and in which at least one threading and the make-up abutment are coated with a thin layer which adheres to the surface of the threading and the make-up abutment, and is constituted by a lubrication composition of the type presented above.

The threaded element may be available in several variations, at least some of the characteristics of which may be combined, in particular:

it may be at least partially covered with a lubrication composition thickness in the range 10 μm to 50 μm;

it may also comprise a sealing surface intended to come into sealed tight contact with a corresponding sealing surface of another threaded element after the make-up operation, and covered with the lubrication composition;

its make-up abutment may be an annular abutment surface;

its surfaces covered with the lubrication composition may have geometrical, physical and/or chemical characteristics which render them able to adsorb or absorb said lubrication composition;

its surfaces may have been coated with a coating or film having a corrosion protective role.

The invention also proposes a threaded tubular connection comprising a male threaded element and a female threaded element at least one of which is of the type presented above.

Other characteristics and advantages of the invention will become apparent from the following description and accompanying drawings in which:

The accompanying drawings not only serve to support the invention but also contribute to its definition if appropriate.

The aim of the invention is to propose a film-forming lubrication (or coating) composition for make-up of threaded connections having a coefficient of friction selected so as to obtain a value for the torque on shoulder resistance which is at least equal to a threshold value on a threaded element of a component of a threaded tubular connection corresponding to a make-up torque profile defined in particular by that torque on shoulder resistance value.

The component will henceforth be assumed to be intended for drilling or exploitation of a hydrocarbon well and that it is provided with at least one male or female threaded element of a coupled or integral threaded tubular connection of the VAM family (trade mark) or equivalent. However, the invention is neither limited to this type of use nor to the type of threaded tubular connection cited above. The invention in effect concerns any type of threaded tubular connection regardless of its use provided that it comprises at least one male or female threaded element provided with at least one threading and a make-up abutment which must be lubricated using the same lubrication composition (or coating). The rotational speeds may be of the order of 10 to 30 rpm at the start of make-up after engaging the threads and a maximum of 2 to 5 rpm at the end of make-up. The diameters are generally from 50 to 400 mm, the linear speeds are in the range 0.3 m/s at the start of make-up to 0.005 m/s at the end of make-up. Further, the contact pressure is low at the start of make-up and very high at the end of make-up in the sealing and abutment zones. The frictional distances are long at the threads from the start of make-up to the end. The frictional distances are very small at the sealing and abutment zones at the end of make-up. The lubrication composition is intended to accommodate extreme pressures, for example of the order of 1.5 GPa at the end of make-up, and slow speeds while reducing the adhesive wear and creep of the threading. An increase in friction during a high decrease in speed and an increase in the Hertz stress is advantageous. The Bridgmann test has proved suitable in testing the envisaged lubrication compositions; in contrast, other tests, for example using an Amsler machine, are not pertinent to the make-up domain as it concerns contact under rolling conditions which are absent during make-up of a connection. These very particular requirements on make-up with sealing zones and abutments mean that a lubrication composition designed for other uses is to be excluded straight away.

Figure 2:
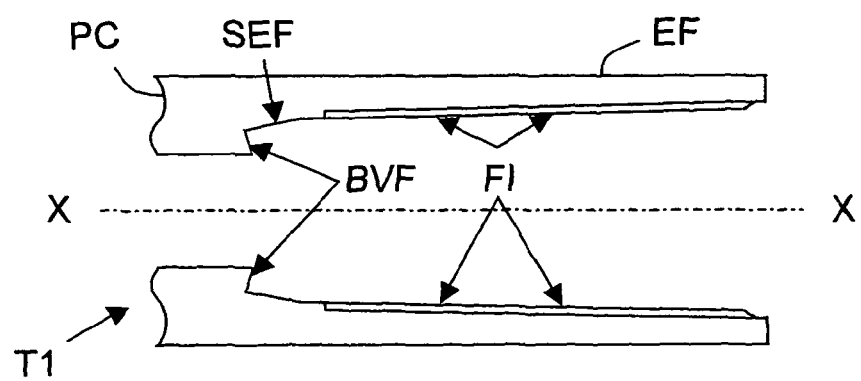
FIG. 2 diagrammatically shows, in a cross section along the longitudinal axis XX, an embodiment of a female element of a first component of a VAM TOP type threaded tubular connection.
Figure 3:
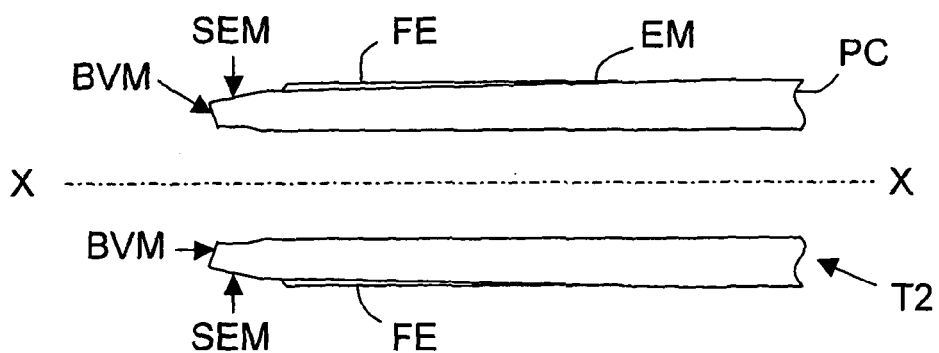
FIG. 3 diagrammatically shows, in a cross section along the longitudinal axis XX, an embodiment of a male element of a second component of a VAM TOP type threaded tubular connection.

As illustrated in FIGS. 2 and 3, a component T1 or T2 comprises a body or regular portion PC terminated by a threaded female EF or male EM element (or end).

A female threaded element EF (see FIG. 2) comprises at least one internal threading FI and a make-up abutment BVF which, for example, is in the form of an inner annular surface (convex conical in the case of a VAM TOP type threaded connection) placed downstream of an internal threading FI.

The free end of the female threaded element EF acts here as a reference. As a result, any elements after the free end are defined as being downstream thereof. In the example illustrated in FIG. 2, the internal threading FI is placed downstream of the free end, but upstream of the abutment make-up BVF.

The term "internal" as used here means a portion disposed along a surface (or a surface) which is orientated towards the longitudinal axis XX of the female threaded element EF.

As illustrated in FIG. 2, the female threaded element EF may optionally comprise a metal/metal sealing surface SEF interposed between the internal threading FI and the make-up abutment BVF.

A male threaded element (see FIG. 3) comprises at least one external threading FE and a make-up abutment BVM which is, for example, in the form of an annular end surface (concave conical in the case of a VAM TOP type threaded connection) placed upstream of the external threading FE at the free end.

The free end of the male threaded element EM acts as a reference in this case. As a result, anything after the free end is said to be downstream thereof.

The term "external" means an element disposed on a surface (or a surface) which is orientated in a direction radially opposite to the longitudinal axis XX of the male threaded element EM.

As illustrated in FIG. 3, the male threaded element EM may optionally comprise a metal/metal sealing surface SEM interposed between the make-up abutment BVM and the external threading FE.

It should be noted that the internal threading FI, like the external threading FE, may be in one or more distinct threaded portions which are axially and/or radially distant from each other, and disposed on cylindrical or tapered surfaces.

Figure 1:
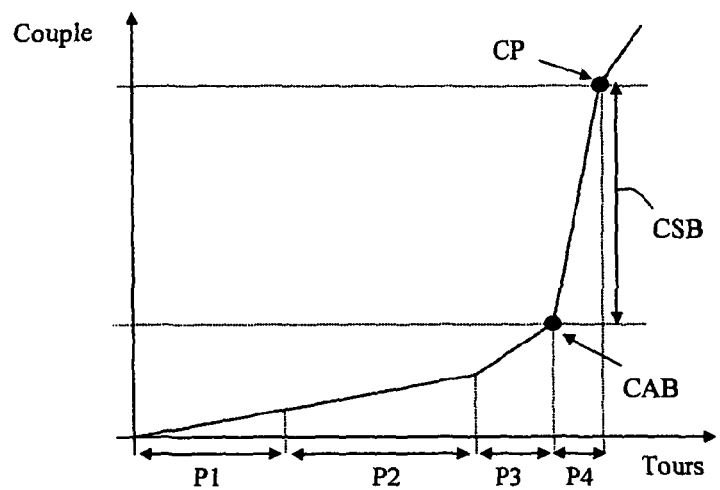
FIG. 1 diagrammatically shows an example of a make-up torque profile (torque as a function of number of turns)
Figure 4:
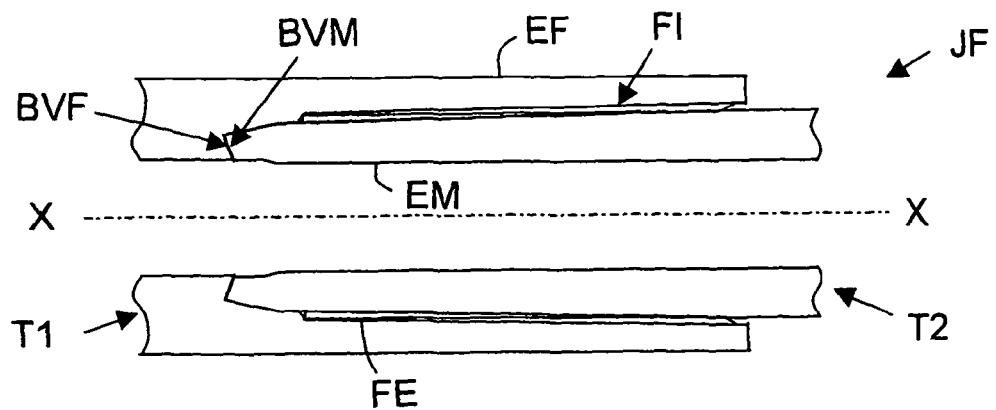
FIG. 4 diagrammatically shows, in a cross section along the longitudinal axis XX, an embodiment of a VAM TOP type threaded tubular connection constituted by assembling the male and female elements illustrated in FIGS. 2 and 3.

As shown in FIG. 4, a threaded tubular connection JF is constituted by assembling, by make-up, a female threaded element EF of a first component T1 to a male threaded element EM of a second component T2. Said make-up is defined by a make-up torque profile of the type illustrated in FIG. 1 and characterized by a shouldering torque CAB, a plastification torque CP and a torque on shoulder resistance CSB (the respective definitions of which were given in the introductory section).

Make-up is carried out when at least one of the make-up abutments BVF and/or BVM and the internal threading FI and/or external threading FE and optionally the metal/metal sealing surfaces SEF and SEM of the female threaded element EF and/or the male threaded element EM have been covered with a lubrication coating (or composition). This coating (or composition) may be deposited on the female EF and/or male EM threaded elements at their production shop.

The lubrication composition has a film-forming nature. It is capable of forming, on a substrate, a thin layer (film) intended to adhere thereto. It comprises a matrix comprising at least one rheoresistant material. As will be seen below, such a lubrication composition is intended to offer "rheoresistant" behaviour during the conditions termed friction plastification of the make-up abutment (i.e. at the end of the tightening phase). Obtaining elastic properties in addition to plastic properties enables that the shear forces be increased under frictional stress. The shear forces are the higher when the elastic component is large and the shear rate is high. A rheoresistant effect is obtained while retaining the frictional properties and keeping the values of the shouldering torque acceptable, avoiding excessive heating due to shear which can vary the rheological properties of the matrix, avoiding rupture of the film beyond a level of stress rendering it susceptible to an excessive lubricating effect, termed humping, and avoiding a film effect, allowing a large number of make-up/breakout operations. The rheoresistant material forming part of the matrix provides the composition with elastic properties which otherwise have essentially plastic properties.

The matrix, also termed the binder, can bind or carry an active principle to a given location. It also serves as a cohesive agent in a heterogeneous system and may have functions which supplement those of the active principles which it binds or carries. It may have a solid consistency which is not tacky to the touch, or it may have a pasty consistency (i.e. have a drop point). However, it preferably exhibits a rheological behaviour with an elastic modulus which is greater than the plastic or viscoplastic modulus, particularly at low frequency and/or at low shear stresses, and a lubricant nature. The term "low frequency" in this case means a frequency of less than 7.5 Hz.

The composition may have a substantially constant elastic modulus over a wide frequency range, with a reference value in the range of 0.1 Hz to 100 Hz which may, for example, be in the range 95% to 105% of the reference value.

The damping factor or phase angle $\delta$ is representative of the ratio of the energy dissipated over the energy conserved then restituted during a sinusoidal deformation cycle. The phase angle $\delta$ may take a low value, in particular from 0.1 to at least 7.5 Hz. The phase angle $\delta$ may be less than 50° at 0.2 Hz, less than 30° at 0.5 Hz, less than 15° at 1 Hz, less than 10° at 5 Hz and/or less than 6° at 10 Hz. The shear strength is excellent, hence a high torque on shoulder resistance, for example more than 90% of the reference value.

The elastic characteristics are substantially higher thanks to the presence of rheoresistant materials in the matrix. The elastic and viscosity moduli are substantially independent of the frequency, at least in the selected range. The rheoresistant materials may comprise at least a rosinic and/or resinic acid, and/or at least one highly viscous polymer, for example an alkyl compound, in particular a polyalkyl methacrylate, a polybutene, a polyisobutene, a polysiloxane and/or a synthesized elastomer, in particular in solution in oil, for example a styrene-ethylene-butylene-styrene block copolymer or an ethylene-octene copolymer, or a natural elastomer, for example of the latex or rubber type. The simultaneous presence of esterified rosin and polyalkyl methacrylate has provided satisfactory synergistic effects.

Adding a pigmentation agent which modifies friction is possible in order to modify friction in accordance with French application 0702634. The pigment does not form part of the composition of the matrix.

The term "solid consistency" as used here means a consistency (or state) which is neither liquid nor gaseous nor pasty. More precisely, a matrix (or a film) in this case is deemed to be in a solid state (or consistency) when it has a melting point of more than a temperature corresponding to that to which the constituents are exposed during storage or use, to prevent them from picking up dust from the atmosphere because of their tacky nature and/or to prevent them from contaminating surfaces coming into contact with the matrix (or film) and/or to prevent them from polluting the environment by migration, drainage or extrusion during make-up/breakout.

The frictional mechanisms during make-up and breakout of the threaded tubular connections are complicated by the wide variety of friction velocities encountered. The velocities may be relatively high during make-up and almost zero at the end of make-up (or tightening phase) or at the start of breakout (loosening phase). Further, Hertz stresses are very high in the same friction periods, resulting in boundary conditions.

It should be remembered that the term "Hertz stress (or pressure)" means the load which is applied by contact on a surface (and which causes elastic deformation thereon) divided by the surface area. Under high Hertz stresses, solid non-plastic materials may undergo internal shear which reduces their service life by fatigue of the material, while solid plastic materials are subjected to this shear in accordance with the laws of flow, with the generation of a friction surface.

In order to overcome problems due to the kinetic stresses cited above, it is advantageous to use a matrix the properties of which are plastic in nature and which allow viscous flow under stress while accommodating all of the rate situations encountered. A matrix formed by several constituents performs better in the presence of a wide variety of shears. It can in fact keep the other active elements in place and contribute to the production of stable transfer films or leafing effect.

As an example, it is possible to use a solid state matrix comprising at least one thermoplastic polymer (or resin) which falls into the category of viscoplastic polymers, such as polyethylene or an acrylic binder. Polyethylene is interesting as it does not suffer from application problems linked to high viscosity in the molten state, as is the case with other viscoplastic polymers such as polyamide 6, polyamide 11 or polypropylene. Advantageous polyethylenes are those which have melting points of more than 105° C. However, a matrix with a melting point in the range 80° C. to 400° C. may be used.

It will be remembered that the term "thermoplastic" describes a fusible polymer which can reversibly be softened then melted by heating to respective temperatures of $T_G$ and $T_F$ (glass transition temperature and fusion temperature) and solidified then vitrified by cooling. Thermoplastic polymers are transformed without chemical reaction, in contrast to thermosetting polymers. Thermosetting polymers are used in this case to obtain, under friction, a viscous flow while retaining a static and stable dry solid structure (not tacky to the touch). In contrast, in general, thermosetting polymers exhibit no or very little viscous behaviour under stress.

It should be noted that when the matrix has to have a solid consistency and high strength mechanical behaviour, it may comprise a thermosetting type binder, such as an epoxy, polyurethane, silicone, alkylurethane or formophenolic resin. In a variation of this type of matrix, it is also possible to use mineral binders such as silicates or chelates such as titanates or organic silicates. In these cases, the composition is also not tacky to the touch.

The matrix may also have a solid consistency which is not tacky to the touch and viscoelastic behaviour. In this case, it may comprise an elastomer or latex.

In order to respond under quasi static conditions to limiting lubrication stresses associated with very high frictional loads, at least one solid type lubricant can be dispersed in the matrix.

The term "solid lubricant" as used here means a solid and stable body which, on being interposed between two frictional surfaces, enables to reduce the coefficient of friction and reduce wear and damage to the surfaces. These bodies may be classified into different categories defined by their functional mechanism and their structure:

class 1: solid bodies owing their lubricant properties to their crystalline structure, with properties of cleaving under a low shear force between certain crystalline planes, for example boron nitride (BN);

class 2: solid bodies owing their lubricant properties to their crystalline structure as indicated in class 1 and also to a chemical element in their composition which reacts with metallic surfaces, providing a supplemental property of surface binding which encourages the formation of a relatively stable lubricating transfer layer, for example molybdenum disulphide $MoS_2$, graphite fluoride, tin sulphides, bismuth sulphides, or tungsten disulphide;

class 3: solid bodies deriving their lubricant properties from their chemical reactivity with metallic surfaces which can create complex cleavable plastic or lubricating compounds, for example certain thiosulphate chemical type compounds, or Desilube 88 sold by Desilube Technologies, Inc;

class 4: solid bodies deriving their lubricant properties from plastic or viscoplastic behaviour under frictional stress, in particular when subjected to shear, for example polytetrafluoroethylene (PTFE), polyethylenes, polypropylenes, polyacetals or polyamides.

This classification is, for example, described in documents from the course entitled "Solid lubricants" given by Mr Eric Gard at the Ecole Nationale Supérieure des Pétroles et Moteurs (France).

In addition to these classes, is the particular category of fullerenes, classified as a sub-class of class 1 with nomenclature 1-3.

As is known to the skilled person, solid lubricants when in the dry and hydrodynamic lubrication conditions, when dispersed in a fluid or viscoplastic material, tend to become bound to surfaces in a stable manner, thereby modifying the frictional characteristics thereof. They are transferred and bound to the surface by chemical or physico-chemical bonds, which results in great resistance to wear and improved frictional properties. Depending on the nature of the solids, this provides the surfaces with an anti-wear protection, strength and anti-wear properties under extreme pressures generated by high loaded surface stress (Hertz stresses) and a low coefficient of friction over a wide spectrum of loads and frictional velocities. Said properties for generating a transfer film effect or a leafing effect are used for types of friction in which the surfaces are stressed in a repetitive manner, such as that produced during make-up and breakout of threaded tubular connections.

The composition may comprise just one solid lubricant, such as graphite fluoride alone or tin sulphide alone or bismuth sulphide alone.

However, the combined use of at least two solid lubricants belonging to different classes can produce synergistic effects and thus the lubrication performances are very good. The term "synergistic effect" as used here means a situation in which the combination of solid lubricants having base properties results in performances which are superior to the cumulated base properties of said solid lubricants taken separately.

Preferred solid lubricants for use in the invention comprise at least compounds from class 2 which has been little used until now, such as graphite fluorides or tin sulphides or bismuth sulphides. They differ from traditional solid lubricants such as graphite (which can facilitate the appearance of corrosion) or molybdenum disulphide (known to be unstable in particular in the presence of moisture and to release oxide of sulphur, which corrodes steel, or hydrogen sulphide which may render steel sensitive to sulphide stress cracking or SSC), in their greater capacity to bind with metals and their better extreme pressure performance. Used synergistically with solid lubricants from other classes, they enable to achieve remarkable performances.

The compounds from class 2 cited above may be used in the form of particles with solid lubricant particles from at least one of classes 1, 3 and 4. Thus, it is possible to use particles of at least one solid lubricant from class 2 and at least one solid lubricant from class 4, or particles of at least one solid lubricant from class 1 and at least one solid lubricant from class 2, or particles of at least one solid lubricant from class 2 and at least one solid lubricant from class 3, or particles of at least one solid lubricant from class 1, at least one solid lubricant from class 2 and at least one solid lubricant from class 4.

A substantial increase in the number of make-up and breakout cycles has been observed under site conditions with systems combining classes 1, 2 and 4 when compared with a class 2/class 4 synergistic effect.

By way of example, the particles of solid lubricant from class 1 may be particles of boron nitride. Again by way of example, the particles of solid lubricant from class 2 may be particles of graphite fluoride, tin sulphide, tungsten sulphide or bismuth sulphide. The particles from class 3 may be particles of Desilube 88 (sold by Desilube Technologies Inc). Again by way of example, the particles of solid lubricant from class 4 may be particles of polytetrafluoroethylene (PTFE) (class 4). Particularly good synergistic effects are obtained with the following combinations: graphite fluoride (class 2)/PTFE/boron nitride (class 1), tungsten sulphide (class 2)/PTFE (class 4)/boron nitride (class 1), and bismuth sulphide (class 2)/PTFE (class 4)/boron nitride (class 1).

As indicated above, the lubrication composition may comprise, as a complement to the matrix (or binder) and any particles of solid lubricant(s), at least one braking additive (or pigment). Each braking additive (or pigment) is dispersed in the matrix.

The braking additive(s) (or pigment(s)) is (are) selected as a function of the make-up torque profile of the threaded tubular connection at least one of the male EM and female EF transformed elements it must cover. More precisely, it (they) is (are) selected to provide the composition, as a complement to its lubricant properties, with a coefficient of friction which is selected to allow a torque on shoulder resistance CSB value at least equal to a threshold value which is to be obtained.

It will be understood that each braking additive is selected as a function of the specific physical properties which provide the composition with a capacity to "brake" the movement applied during make-up in the lubricated conditions as a function of the make-up torque profile of the threaded tubular connection, and thus of the mode of producing it. In fact, two materials which are under relative friction separated by a third interposed body (in this case the lubrication composition) owe their properties to at least two factors: the rheological behaviour of the matrix and the behaviour of certain solid compounds participating in the composition of said third body. The rheological behaviour of the third body may be hydrodynamic in the case of an oil, viscoplastic in the case of certain waxes and certain polymer or granular in the case of certain non-ductile or very hard mineral compounds.

The behaviour of certain solid compounds participating in the composition of the third body varies in accordance with certain parameters:
- the concentration of the third body in the hydrodynamic or viscoplastic medium;
- the hardness or crush strength of the particles of the solid compounds, which is characterized by the Mohs hardness;
- the cleavage capacity of the crystals of solid compounds with varying degrees of stress, which principally depends on the crystalline structure;
- the particulate interactions which depend on the shape and surface energy of the solid compound particles, and the binding capacities between said particles (attraction between atoms via Van der Waals type bonds, a function of the chemical nature of the particles); these interactions tend to oppose movement;
- the reverse rheological behaviour (or reverse thixotropy) of certain very high molecular weight organic additives which enable to oppose a shear force and thus movement.

It is important to note that the respective proportions of the constituent types of the lubrication composition principally depend on the type (thermoplastic, thermosetting or otherwise) of the solid matrix used. As an example, when the solid matrix is thermoplastic in type, the lubrication composition may comprise a proportion of matrix in the range from approximately 75% to approximately 97%, and a proportion of solid lubricant(s) in the range from approximately 3% to approximately 25%.

Further, it will be understood that the variations in the various proportions of the three types of constituent of the lubrication composition, with respect to each other, depend in particular on the type of threaded tubular connection which it must partially cover and the stresses to which that threaded tubular connection are subjected, in particular under site conditions.

The respective compositions by weight of the three types of constituent (solid matrix, solid lubricant(s) and braking additive(s)) of a lubrication composition may, for example, be determined using theoretical simulations carried out with software running on a computer and tribological tests carried out using a machine which the skilled person (a specialist in tribology) knows as a Bridgmann machine. This type of machine has been described in particular in the article by D Kuhlmann-Wilsdorf et al, "Plastic flow between Bridgmann anvils under high pressures", J Mater Res, vol 6, no 12, December 1991.

Figure 5:
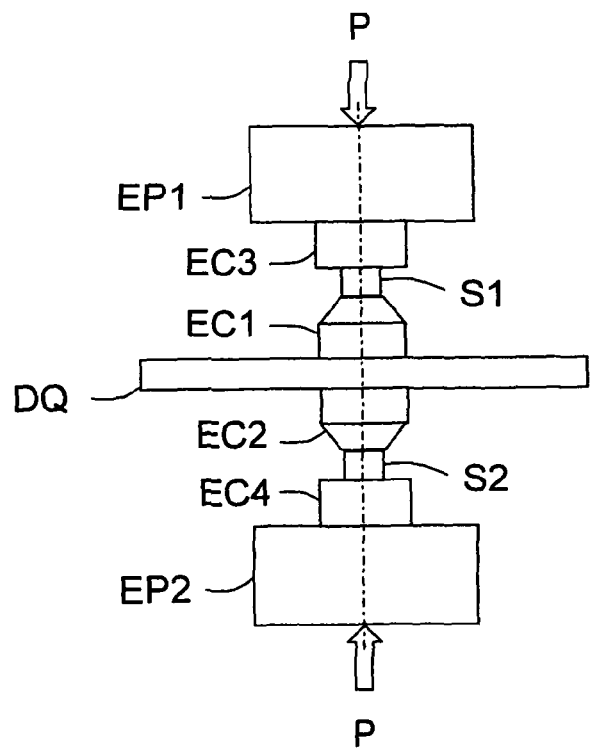
FIG. 5 diagrammatically and functionally shows an embodiment of a Bridgman type machine.

A diagrammatic and functional example of a Bridgmann machine is shown in FIG. 5. This machine comprises:
- a disk DQ which can be driven in rotation at selected speeds;
- a first anvil EC1, preferably conical in type, fixed to a first face of the disk DQ;
- a second anvil EC2, preferably conical in type, fixed to a second face of the disk DQ, opposite the first face;
- first EP1 and second EP2 pressure elements such as pistons, for example, which can exert selected axial pressures P;
- a third anvil EC3, preferably cylindrical in type, fixed to one face of the first pressure element EP1;
- a fourth anvil EC4, preferably cylindrical in type, fixed to one face of a second pressure element EP2.

To test a lubrication composition, two pieces of a material identical to that constituting the threaded element are covered with it to form first S1 and second S2 specimens. Next, the first specimen S1 is interposed between the free faces of the first EC1 and third EC3 anvils, and the second specimen S2 between the free faces of the second EC2 and fourth EC4 anvils. Next, the disk DQ is rotated at a selected speed while applying a selected axial pressure P (for example of the order of 1.5 GPa) using each pressure element EP1 and EP2, and the make-up torque to which each sample S1, S2 is subjected is measured.

The axial pressure, the speed of rotation and the angle of rotation are selected in the Bridgmann test to simulate the Hertz pressure and the relative speed of the abutment surfaces at the end of make-up.

Thanks to such a machine, a number of different pairs (make-up torque, rotational speed) can be fixed to measure the corresponding make-up torque on samples S1 and S2, and to verify whether said samples S1 and S2 approximately follow a given make-up torque profile, and in particular whether they enable to produce a torque on shoulder resistance value CSB at least equal to a threshold value selected with respect to that profile. It will be understood that these tests carried out with the Bridgmann machine enable to establish a correlation between the torque measured for specimens coated with a lubrication composition of the invention and a percentage of the torque on shoulder resistance CSB obtained during operations for make-up of threaded elements coated with the same lubrication composition.

In order to improve certain selected properties of the composition, its matrix may comprise additional elements such as those which are mentioned below by way of non exhaustive illustration.

Thus, an improved plasticity of the matrix of the composition may be obtained by adding chemical compounds of the metallic soap type, including calcium, lithium, aluminium, bismuth, sodium, magnesium or zinc soaps (or stearates) which provide excellent results as regards the number of make-up and breakout steps under site conditions as well as an improvement in debris reagglomeration properties. It should be remembered that the term "metallic soap" means fusible compounds such as alkali metal and alkaline-earth metal soaps and soaps of other metals. As an example, it is possible to use a metallic soap such as zinc stearate which provides a synergistic effect with certain corrosion inhibitors.

As an example, to improve the lubrication offered by the composition, and in particular to optimize its debris blocking and reagglomeration properties during make-up/breakout operations, its matrix may include a natural fat, such as a wax of vegetable, animal, mineral or synthetic origin. It should be remembered that the term "wax" means fusible substances with lubricant properties of various origins (mineral, in particular derived from the distillation of oil, vegetable, animal or synthetic) the hard or more or less pasty consistency of which and the fusion temperature of which and the drop point of which may vary to a wide extent depending on their nature. As an example, it is possible to use carnauba wax. The matrix may have an increased adhesion when it includes a resin (mineral, vegetable or synthetic), for example a terpene resin or a terpene resin derivative, in particular rosin. The rosin may be esterified with pentaerythritol. It is possible to use Dertoline P2L sold by the firm "Les Dérivés Résiniques et Terpéniques".

It will be noted that as a function of the quantities required of corrosion inhibitors, degradation of the debris trapping or reagglomeration properties may be observed. To overcome this disadvantage, it is possible to use very viscous polymers such as polyalkyl methacrylates (PAMA), polybutenes, polyisobutenes or polysiloxanes. Thus, excellent results for debris reagglomeration may be obtained with a PAMA with a kinematic viscosity of 850 mm$^2$/s at 100° C., sold by ROHMAX under the trade name VISCOPLEX 6-950.

As an example, to improve the protection of the surface that the composition must cover against different modes of corrosion, its matrix may comprise a corrosion inhibitor. It should be remembered that the term "corrosion inhibitor" means an additive providing a liquid or solid material applied to a surface with the capacity to protect it by a chemical, electrochemical or physico-chemical mechanism.

Corrosion resistance may also be improved by combining the selected corrosion inhibitor with compounds which block corrosion by means of other mechanisms. As indicated above, zinc stearate in particular exhibits synergistic properties with corrosion inhibitors while contributing greatly to the lubricant behaviour of the matrix.

The principal anticorrosion protection test is the saline mist test carried out in accordance with ISO standard 9227 and determined by the index Re in accordance with ISO EN 2846-3 on a plate treated by manganese phosphatation (deposit of 8 to 20 g/m$^2$ of phosphate). The performances in the saline mist test carried out in accordance with the standards (increase of 20% in corrosion appearance time) may be improved by inserting zinc oxide particles of nanometric dimensions (mean 200 nm) applied as a simple dispersion in water.

As an example, to allow the composition to block, in a stable manner, sites which are created by surface roughness and to block the surface damage process and propagation while creating a continuous cleavable structure on the surface, the composition may include molecules of at least one fullerene of spherical geometry. It should be remembered that the the term "fullerenes" means molecular materials having a structure in the form of closed or open tubes or closed spheres, as a monolayer or in multiple layers. Spherical fullerenes have dimensions of a few tens of nm as a monolayer and more than 100 nm as a multilayer. It should be noted that because of their size and interactive capacity, fullerenes may have a determinant effect on the rheology of the medium by introducing an additional phenomenon of viscous resistance to movement.

As an example, to allow visual identification of the treated surfaces, the matrix of the composition may include at least one colorant. Any type of organic colorant which is known may be used, provided that the quantity thereof does not degrade the frictional performances. As an example, colorants may be used in quantities of approximately 1%.

As an example, to preserve the coating from degradation by oxidation due, for example, to heat or exposure to UV radiation, the matrix of the composition may optionally comprise at least one antioxidant. It will be recalled that polyphenolic compounds, naphthylamine derivatives and organic phosphites constitute the principal families of antioxidants.

Zinc calcium strontium orthophosphate silicate sold under the trade name Halox® SZP391 had provided satisfactory results as a corrosion inhibitor.

The miscibility of the elements of the composition may be enhanced with a co-solvent allowing its homogenization. A copolymer with acrylic functional groups may be used, for example that sold under the trade name Disperplast® 1018.

Optionally, the composition may include a polyethylene/polytetrafluoroethylene composite with the aim of rendering the formulation hydrophobic and hydrofugic, for example that sold under the trade name Polyfluo® 400XF.

Surface preparation of the portions to be lubricated of the male EM and female EF threaded elements may prove advantageous. In fact, make-up and breakout tests have shown that to obtain a proper transfer film, it is preferable to modify the surface to be coated to render it capable of adsorbing or absorbing the lubrication composition, either by means of a mechanical treatment such as sand-blasting or shot peening, or by physical or chemical modification of the surfaces using a reactive or non reactive treatment based on crystalline mineral surface deposits, chemical attack, for example by an acid, a zinc or manganese phosphatation treatment or oxalatation resulting in a chemical conversion on the surface. Of these surface treatments, phosphatation is preferred as it enables to produce a surface with the correct adhesion resulting in the establishment of a strong and very stable transfer film which is resistant to friction as well as a basic anticorrosion protection.

It may also be desirable to carry out a complementary surface preparation consisting in particular in impregnating the pores of the surface with nanomaterials which have dimensions allowing them to become inserted into the pores. The aim of said impregnation is to block and saturate the sites created by the pores with a material with a passivating action protecting the surface against corrosion while maintaining good adhesion for the coating.

We shall now present two non-limiting examples of the composition. These examples are well suited to VAM TOP HC type threaded tubular connections with a nominal diameter of 177.8 mm (7 inches) and with a weight per unit length of 43.15 kg/m (29 lb/ft) in low alloy steel (grade L80) using the technique note published by the OCTG division of Vallourec and Mannesmann Tubes. The male threaded element has, for example, undergone phosphatation with zinc (weight of layer in the range 4 to 20 g/m$^2$) before application of the coating (composition) and the female threaded layer has undergone phosphatation with manganese (weight of layer in the range 8 to 20 g/m$^2$). The male EM and female EF threaded elements are preheated to 130° C., then a 35 μm thick layer of a lubrication composition which is kept molten at 150° C. is applied to them by hot spraying; the composition has the following composition by weight:

polyethylene wax sold by CLARIANT under the trade name LICOWAX® PE 520: 15%
rosin esterified with pentaerythritol, in particular that sold by LES DERIVES RESINIQUES ET TERPENIQUES (DRT) under the trade name DERTOLINE® P2L: 15%;
carnauba wax sold under the trade name LANCO® 1955SF: 5%;
zinc stearate sold under the trade name LIGASTAB® ZN70: 25%;
PAMA sold by ROHMAX under the trade name VISCOPLEX® 6-950: 8%;
zinc calcium strontium orthophosphate silicate sold under the trade name Halox® SZP391: 20%;
graphite fluoride: 5%;
boron nitride: 2%;
tungsten disulphide: 5%;
copolymer with functional groups sold under the trade name Disperplast® 1018: 5%.

In this example the matrix is viscoelastic in type; the solid lubricants are composed of tungsten disulphide and graphite fluoride.

In a variation, the composition comprises 10% to 25% by weight, preferably 10% to 20%, of a rosin ester resin.

The composition may be as follows:
polyethylene wax: 10%;
polyethylene/polytetrafluoroethylene composite sold under the trade name Polyfluo® 400XF: 5%;
rosin esterified with pentaerythritol: 15%;
carnauba wax: 7%;
zinc stearate: 25%;
PAMA: 8%;
zinc calcium strontium orthophosphate silicate: 15%;
graphite fluoride: 7%;
polytetrafluoroethylene sold under the trade name Algoflon® L203: 2%;
boron nitride: 1%;
copolymer with functional groups sold under the trade name Disperplast® 1018: 5%.

In a variation, the percentages by weight are between those of the two examples given above.

In a variation, it is possible, for example, to apply, by hot spraying onto male EM and female EF threaded elements preheated to 130° C., a 35 μm thick layer of a lubrication composition which is kept molten at 150° C. with the following composition by weight:
polyethylene wax: 12%;
polyethylene/polytetrafluoroethylene composite sold under the trade name Polyfluo® 400XF: 3%;
rosin esterified with pentaerythritol: 15%;
carnauba wax: 7%;
zinc stearate: 25%;
PAMA: 8%;
zinc calcium strontium orthophosphate silicate: 18%;
graphite fluoride: 6%;
tungsten disulphide: 2%;
copolymer with functional groups sold under the trade name Disperplast® 1018: 4%.

In this variation, the matrix is also viscoelastic in type.

In a variation, the composition by weight is as follows:
polyethylene wax: 17%;
polyethylene/polytetrafluoroethylene composite sold under the trade name Polyfluo® 400XF: 1%;
rosin esterified with pentaerythritol: 20%;
carnauba wax: 5%;
zinc stearate: 19%;
PAMA: 10%;
zinc calcium strontium orthophosphate silicate: 12%;
graphite fluoride: 5%;
polytetrafluoroethylene: 1%;
boron nitride: 2%;
tungsten disulphide: 3%;
copolymer with functional groups sold under the trade name Disperplast® 1018: 5%.

The copolymer with functional groups acts as a coupling agent.

In a variation, the percentage by weight of each of the following constituents may be less than 0.1%, preferably less than 0.01%: calcium sulphonate and carboxylate, zinc oxide, titanium dioxide, bismuth trioxide, polytetrafluoroethylene, silicone, alkylated diphenylamine, tris(2,4-di-tert-butylphenyl) phosphite.

Said hot melt spray technique consists of keeping the lubrication composition at a high temperature in the liquid phase and spraying using thermostatted spray jets. The lubrication composition is heated to between 10° C. and 50° C. above its melting point and sprayed onto a preheated surface at a temperature which is higher than the melting point to ensure the surface is properly covered.

Instead of using this hot melt spray technique it is possible, for example, to spray the lubrication composition in the form of an aqueous emulsion. The emulsion and the substrate may be at ambient temperature, and so a drying period is necessary. This drying period may be considerably reduced by preheating the lubrication composition to between 60° C. and 80° C. and/or the surface to between 50° C. and 150° C.

The invention is not limited to the lubrication composition examples and the examples of the (male or female) threaded element described above, given solely by way of example, but also encompasses any variations which the skilled person could envisage which fall within the scope of the accompanying claims.

Thus, the invention also concerns other types of threaded element than those described above (VAM TOP). As an example, it also concerns the threaded elements of threaded tubular connections with an internal abutment, coupled (for example those of the NEW VAM, VAM ACE, DINOVAM, VAM HW ST type) or integral flush or semi-flush type (for example those of the VAM SL, VAM MUST, VAM HP, VAM HTF type).

The invention may also concern elements of threaded connections for strings or other rotary drilling components defined by specification API 7 or by more severe specifications from certain producers (such as, by way of non limiting example, the premium threaded connections VAM EIS, VAM TAURUS, TORQMASTER TM4 and derivatives and developments of such connections).

Further, in the foregoing we have principally described a lubrication composition comprising one or more solid lubricant(s) and a matrix with a solid consistency comprising at least one rheoresistant material. However, the invention also concerns semi-dry lubrication compositions comprising a pasty matrix, at least one extreme pressure additive with a chemical action and one or more braking additives.

The invention claimed is:

1. A film-forming lubrication composition, comprising a matrix comprising 10% to 25% s a concentration by weight of at least one rheoresistant material which endows the composition, as a complement to lubrication, with a torque on shoulder resistance value which is at least equal to a threshold value,
wherein the matrix having a solid consistency, being not tacky to the touch, and
wherein the film-forming lubrication composition is suitable for make-up of a threaded connection, to cover at least one threading and a make-up abutment of a threaded element of a component of a threaded tubular connection with a solid state film which adheres to threading and to the make-up abutment, the make-up abutment being suitable to bear against another abutment of another component of the threaded tubular connection during a terminal make-up phase,
wherein the at least one rheoresistant material is arranged to allow a torque on shoulder resistance value to be obtained which is at least equal to a threshold value equal to 95% of a reference torque on shoulder resistance value for an API RP 5A3 type grease obtained for said threaded tubular connection,
wherein the rheoresistant material comprises 1% to 99% as a concentration by weight of terpene resin comprising at least one selected from the group consisting of
alpha pinene, rosinic acid and resinic acid esterified with pentaerythritol,
rosinic acid and resinic acid hydrogenated and esterified with glycerine, and polymerized rosin.

2. The lubrication composition of claim 1, wherein the rheoresistant material comprises 1% to 99% of rosinic and resinic acid esterified with pentaerythritol, as a concentration by weight.

3. The lubrication composition of claim 1, comprising at least one selected from the group consisting of:
10% to 20% of polyethylene wax;
0 to 5% of polyethylene/polytetrafluoroethylene composite;
10% to 25% of esterified rosin;
0 to 20% of carnauba wax; 20% to 30% of zinc stearate;
15% to 25% of zinc calcium strontium orthophosphate silicate;
4% to 12% of graphite fluoride; 0 to 4% of polytetrafluoroethylene;
1% to 3% of boron nitride;
2% to 8% of tungsten disulphide; and
2% to 8% of coupling agent, as a concentration by weight.

4. The lubrication composition of claim 1, further comprising at least one braking additive comprising at least one dispersion of mineral or organic particles
wherein each braking additive comprises at least one selected from the group consisting of bismuth oxide, titanium oxide, colloidal silica, and carbon black.

5. The lubrication composition of claim 1, further comprising at least one particle of at least one solid lubricant dispersed in the matrix,
wherein the at least one particle comprises at least one solid lubricant selected from the group consisting of classes 1, 2, 3, and 4.

6. The lubrication composition of claim 1, wherein the matrix comprises at least one binder with a viscoelastic behavior.

7. The lubrication composition of claim 1, wherein the matrix further comprises at least one metallic soap.

8. The lubrication composition of claim 7, wherein the soap comprises at least one selected from the group consisting of zinc stearate, calcium stearate, lithium stearate, aluminum stearate, and bismuth stearate.

9. The lubrication composition of claim 1, wherein the matrix further comprises at least one wax of vegetable, animal, mineral or synthetic origin.

10. The lubrication composition of claim 1, wherein the matrix further comprises at least one liquid polymer with a kinematic viscosity at 100° C. of at least 850 mm$^2$/s.

11. The lubrication composition of claim 10, wherein the liquid polymer comprises at least one selected from the group consisting of a polyalkyl methacrylate, a polybutene, a polyisobutene, a polydialkylsiloxane, and a polysiloxane.

12. A threaded element, comprising:
at least one threading; and
a make-up abutment against which another abutment of another component of the threaded tubular connection must bear at an end of a make-up operation,
wherein at least the threading and the make-up abutment are coated with a thin layer which adheres to a surface of the threading and the make-up abutment, and
the thin layer comprises the lubrication composition of claim 1.

13. The threaded element of claim 12, which is at least partially covered with the lubrication composition with a thickness in a range 10 μm to 50 μm.

14. The threaded element of claim 12, further comprising:
a sealing surface suitable to come into sealed tight contact with a corresponding sealing surface of another threaded element after the make-up operation, and covered with the lubrication composition.

15. The threaded element of claim 12, having at least one surface pre-coated with a coating or film which acts to protect against corrosion.

16. A threaded tubular connection, comprising:
a male threaded element, and
a female threaded element, wherein at least one of said threaded elements is the threaded element of claim 12.

17. The lubrication composition of claim 1, wherein the at least one rheoresistant material is arranged to allow a torque on shoulder resistance value to be obtained which is at least equal to a threshold value equal to 100% of a reference torque on shoulder resistance value for an API RP 5A3 type grease obtained for said threaded tubular connection.

* * * * *

UNITED STATES PATENT AND TRADEMARK OFFICE
CERTIFICATE OF CORRECTION

PATENT NO. : 8,735,334 B2  Page 1 of 1
APPLICATION NO. : 13/123909
DATED : May 27, 2014
INVENTOR(S) : Eliette Pinel et al.

It is certified that error appears in the above-identified patent and that said Letters Patent is hereby corrected as shown below:

On the Title Page, Item (86), "(2), (4) Date: Apr. 13, 2011" should read
--Apr. 15, 2011--.

In the Specification

Column 4, line 63, "100°C." should read --100°C--.

Column 9, line 29, "80°C. to 400°C." should read --80°C to 400 C.--.

Column 13, line 53, "100°C." should read --100°C--.

Column 15, line 19, "130°C." should read --130°C--;
    line 20, "150°C." should read --150°C--;
    line 62, "130°C." should read --130°C--;
    line 63, "150°C." should read --150 C--.

Column 16, line 38, "10°C. and 50°C." should read --10°C and 50°C--;
    line 47, "60°C." should read --60°C--;
    line 48, "80°C. and/or the surface to between 50°C. and 150°C." should read
        --80°C and/or the surface to between 50°C and 150°C.--.

In the Claims

Column 18, line 24, "100°C." should read --100°C--.

Signed and Sealed this
Thirtieth Day of December, 2014

Michelle K. Lee
*Deputy Director of the United States Patent and Trademark Office*